(12) United States Patent
Cao et al.

(10) Patent No.: US 9,367,758 B2
(45) Date of Patent: Jun. 14, 2016

(54) FEATURE EXTRACTION DEVICE, FEATURE EXTRACTION METHOD, AND FEATURE EXTRACTION PROGRAM

(71) Applicant: Panasonic Corporation, Osaka (JP)

(72) Inventors: Yunyun Cao, Tokyo (JP); Hirofumi Nishimura, Kanagawa (JP); Sugiri Pranata, Singapore (SG); Zhiheng Niu, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 11 days.

(21) Appl. No.: 14/368,411

(22) PCT Filed: Jan. 11, 2013

(86) PCT No.: PCT/JP2013/000104
§ 371 (c)(1),
(2) Date: Jun. 24, 2014

(87) PCT Pub. No.: WO2013/105513
PCT Pub. Date: Jul. 18, 2013

(65) Prior Publication Data
US 2015/0016679 A1  Jan. 15, 2015

(30) Foreign Application Priority Data

Jan. 12, 2012  (JP) .................................. 2012-004359

(51) Int. Cl.
*G06K 9/46* (2006.01)
*G06K 9/62* (2006.01)

(52) U.S. Cl.
CPC ............ *G06K 9/4604* (2013.01); *G06K 9/4642* (2013.01); *G06K 9/6202* (2013.01); *G06K 9/6212* (2013.01); *G06K 2009/4666* (2013.01)

(58) Field of Classification Search
None
See application file for complete search history.

(56) References Cited

U.S. PATENT DOCUMENTS

| 2006/0045356 A1 | 3/2006 | Turtinen et al. |
| 2009/0220155 A1 | 9/2009 | Yamamoto et al. |

(Continued)

FOREIGN PATENT DOCUMENTS

| JP | 2005-537578 A | 12/2005 |
| JP | 2009-86926 A | 4/2009 |
| JP | 2009-211179 A | 9/2009 |

OTHER PUBLICATIONS

International Search Report for Application No. PCT/JP2013/000104 dated Apr. 2, 2013.

(Continued)

*Primary Examiner* — Jon Chang
(74) *Attorney, Agent, or Firm* — Pearne & Gordon LLP

(57) ABSTRACT

Device (10) comprises: a comparison object pixel acquisition unit (433) which acquires pixel values of a plurality of comparison object pixels which, when each pixel of an image is designated as a pixel of interest, and a ring-shaped region with the pixel of interest being designated as the center thereof being designated a vicinity region, said comparison object pixels are included in the vicinity region; a pixel difference calculation unit (434) which calculates the difference between the pixel value of the pixel of interest and the pixel values of each comparison object pixel; and a local binary pattern generation unit (435) which generates a local binary pattern for each pixel. A plurality of vicinity regions are present for each pixel of interest, and the distance of the vicinity regions are established on the basis of the spatial frequency characteristics of a lens with which the image is photographed.

10 Claims, 14 Drawing Sheets

(56) References Cited

U.S. PATENT DOCUMENTS

| | | | |
|---|---|---|---|
| 2012/0070041 A1* | 3/2012 | Wang | G06F 21/32 382/118 |
| 2012/0213422 A1* | 8/2012 | Niskanen | G06K 9/00228 382/118 |
| 2012/0288167 A1* | 11/2012 | Sun | G06K 9/00281 382/118 |

OTHER PUBLICATIONS

Timo Ojala, Matti Pietikäinen and Topi Mäenpaa "Multiresolution Gray-Scale and Rotation Invariant Texture Classification With Local Binary Patterns" IEEE, Pattern Analysis and Machine Intelligence vol. 24 No. 7, pp. 971-987, Jul. 2002.

Yutaka Sato et al., "Robust Object Detection and Segmentation by Peripheral Increment Sign Correlation Image", The Transactions of the Institute of Electronics, Information and Communication Engineers (J84-D-II), No. 12, Dec. 1, 2001, vol. J84-D-II, No. 12, pp. 2585 to 2594.

* cited by examiner

FEATURE EXTRACTION DEVICE, FEATURE EXTRACTION METHOD, AND FEATURE EXTRACTION PROGRAM

TECHNICAL FIELD

The present invention relates to a feature extracting apparatus, a feature extracting method, and a feature extracting program that extract an image feature from an image taken through a lens.

BACKGROUND ART

Techniques have been widely used that extract an image feature from an image taken through a lens and detect or classify an object included in an image (hereinafter, referred to as "object detection"). For example, as some of the object detection techniques, techniques that use Local Binary Patterns (hereinafter, referred to as "LBPs") are described in Patent Literature (hereinafter, referred to as PTL) 1 and Non-Patent Literature (hereinafter, referred to as NPL) 1.

LBP is a binary pattern created by calculating differences in pixel values between each pixel and its surrounding neighborhood pixels and placing the resulting binary numbers. That is, LBPs are information representing gray scale patterns included in an image.

The techniques described in PTL 1 and NPL 1 (hereinafter, referred to as "related art") determine LBPs of all or a part of pixels within a region in an image targeted for classification (hereinafter, referred to as "target image"). The related art then generates a histogram of values of the LBPs as an image feature. The related art also generates a classifier in advance using histograms generated similarly from images including a predetermined object and images not including the object (hereinafter, collectively referred to as "training images") and stores the classifier. The related art then evaluates the histogram of the target image using the classifier. The related art thereby determines whether the target image includes the predetermined object.

Histograms of LBPs can represent differences in texture and gray scale patterns more accurately than image features such as histograms of oriented gradients (HOGs). Furthermore, the calculation of histograms of LBPs requires less processing cost compared with HOGs. Thus, the object detection using LBPs, such as the related art, is expected to be applied to various fields.

CITATION LIST

Patent Literature

PTL 1
Japanese Patent Application Laid-Open No. 2009-211179

Non-Patent Literature

NPL 1
Timo Ojala, Matti Pietikäinen and Topi Mäenpää"Multiresolution Gray-Scale and Rotation Invariant Texture Classification With Local Binary Patterns" IEEE, Pattern Analysis and Machine Intelligence vol. 24 no. 7, pp. 971-987, July 2002

SUMMARY OF INVENTION

Technical Problem

Incidentally, in order to improve the accuracy of the object detection, it is preferred to use a feature with as high classification performance as possible. For this purpose, some may consider using both microscopic information such as the gray scale pattern between adjacent pixels, and macroscopic information such as the gray scale pattern between pixels at a certain distance as a feature. In the case of LBPs, multiple annular regions (hereinafter referred to as "neighborhood region") each having a pixel of interest at its center may be set, and the pixels of each neighborhood region may be set as pixels targeted for comparison with the pixel of interest (hereinafter, referred to as "comparison target pixels").

However, the number of the comparison target pixels increases in this case, and the number of bits of LBPs and the dimension number of the histogram increase. This increases the loads of a calculation process of LBPs, a generation process of a histogram, a generation process of a classifier, and an object detection process. On the other hand, when the number of comparison target pixels is simply reduced in order to avoid such an increase in the processing loads, it is difficult to improve the classification performance of the obtained LBPs. That is, the related art has a problem in that it is difficult to provide both a reduction in processing loads and the extraction of a feature with high classification performance.

An object of the present invention is to provide a feature extracting apparatus, a feature extracting method, and a feature extracting program that can extract a feature with high classification performance while reducing an increase in processing loads.

Solution to Problem

A feature extracting apparatus according to an aspect of the present invention includes: a comparison target pixel acquiring section that acquires pixel values of a plurality of comparison target pixels included in a neighborhood region when an annular region having a pixel of interest at its center is set as the neighborhood region while all pixels or partial pixels in an image taken through a lens are each set as the pixel of interest; a pixel difference calculating section that calculates a difference between the pixel value of the pixel of interest and the pixel value of each of the comparison target pixels; and a local binary pattern generating section that generates a local binary pattern indicating, using a bit value, whether the difference between the pixel value and the pixel value of each of the comparison target pixels is equal to or greater than a predetermined threshold for each of the pixels, in which a plurality of the neighborhood regions are present for each of the pixels of interest, and a distance between the plurality of neighborhood regions is determined based on spatial frequency characteristics of the lens.

A feature extracting method according to an aspect of the present invention includes: acquiring pixel values of a plurality of comparison target pixels included in a neighborhood region when an annular region having a pixel of interest at its center is set as the neighborhood region while all pixels or partial pixels in an image taken through a lens are each set as the pixel of interest; calculating a difference between the pixel value of the pixel of interest and the pixel value of each of the comparison target pixels; and generating a local binary pattern indicating, using a bit value, whether the difference between the pixel value and the pixel value of each of the comparison target pixels is equal to or greater than a predetermined threshold for each of the pixels, in which a plurality of the neighborhood regions are present for each of the pixels of interest, and a distance between the plurality of neighborhood regions is determined based on spatial frequency characteristics of the lens.

A feature extracting program stored on a non-transitory computer-readable medium according to an aspect of the present invention causes a computer to execute processing including: acquiring pixel values of a plurality of comparison target pixels included in a neighborhood region when an annular region having a pixel of interest at its center is set as the neighborhood region while all pixels or partial pixels in an image taken through a lens are each set as the pixel of interest; calculating a difference between the pixel value of the pixel of interest and the pixel value of each of the comparison target pixels; and generating a local binary pattern indicating, using a bit value, whether the difference between the pixel value and the pixel value of each of the comparison target pixels is equal to or greater than a predetermined threshold for each of the pixels, in which a plurality of the neighborhood regions are present for each of the pixels of interest, and a distance between the plurality of neighborhood regions is determined based on spatial frequency characteristics of the lens.

Advantageous Effects of Invention

According to the present invention, it is possible to extract a feature with high classification performance while reducing an increase in processing loads.

DESCRIPTION OF EMBODIMENTS

Each embodiment of the present invention will be described hereinafter in detail with reference to the accompanying drawings.

Embodiment 1

Embodiment 1 of the present invention is an example of a basic mode of the present invention.

Figure 1:
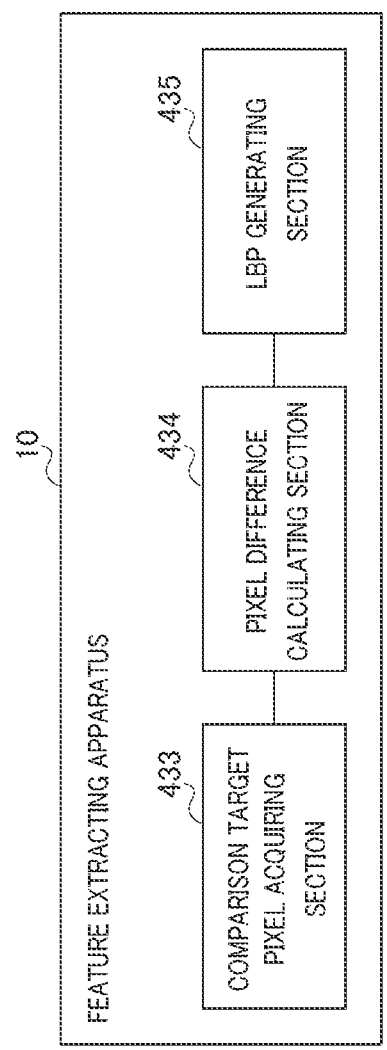
FIG. 1 is a block diagram illustrating an example of the configuration of a feature extracting apparatus according to Embodiment 1.

FIG. 1 is a block diagram illustrating an example of the configuration of a feature extracting apparatus according to the present embodiment.

In FIG. 1, feature extracting apparatus 10 includes comparison target pixel acquisition section 433, pixel difference calculating section 434, and LBP generating section 435.

Comparison target pixel acquisition section 433 acquires the pixel values of multiple comparison target pixels included in a neighborhood region of an image taken through a lens. The neighborhood region is an annular region having a pixel of interest at its center for each of all or a part of pixels in the image.

Pixel difference calculating section 434 calculates the difference between the pixel value of a pixel of interest and the pixel value of each comparison target pixel.

LBP generating section 435 generates the LBP for each pixel. The LBP is information indicating whether differences in pixel values with respect to multiple comparison target pixels are each equal to or greater than a predetermined threshold, using bit values.

The plurality of above-described neighborhood regions exist for each pixel of interest. The distances of the neighborhood regions are determined on the basis of the spatial frequency characteristics of the lens.

In the following description, the distances of the neighborhood regions are the distances between the neighborhood regions. For example, when the above-mentioned annular region is treated as the neighborhood region, the distance between two annular neighborhood regions refers to the difference between the radiuses of these two annular regions. The distances of multiple pixels (comparison target pixels) are the distances between the pixels, and refer to, for example, the distances between the center positions of the pixels. Therefore, the distance between two vertically or horizontally adjacent pixels is one pixel, for example.

Feature extracting apparatus 10 includes, for example, a CPU (central processing unit), a storage medium such as a ROM (read only memory) storing a control program, and a working memory such as a RAM (random access memory), although they are not illustrated. In this case, the function of the above-mentioned each component is implemented by the CPU executing the control program.

Such feature extracting apparatus 10 can generate LBPs for each pixel from the comparison target pixel group included in multiple annular regions. Accordingly, it is possible to extract a feature with high classification performance as the LBP, the feature including both microscopic information and macroscopic information.

Feature extracting apparatus 10 may allow multiple comparison target pixels to have mutually directions with respect to the pixel of interest. In this case, feature extracting apparatus 10 can generate the LBP from comparison target pixel group placed in consideration of the spatial frequency characteristics of the lens and extraction of brightness difference information on the plurality of directions with respect to the pixel of interest. Thereby, feature extracting apparatus 10 can avoid acquiring a large number of pixel values at an unnecessarily near distance in terms of the spatial frequency characteristics of the lens, and using for a calculation, and can extract a feature with high classification performance with a reduced processing load.

Embodiment 2

Embodiment 2 of the present invention is an example of a specific mode when the present invention is applied to an object detecting system that generates a classifier and detects an object from an image.

The configuration of the object detecting system including the feature extracting apparatus according to the present embodiment will be described hereinafter.

Figure 2:
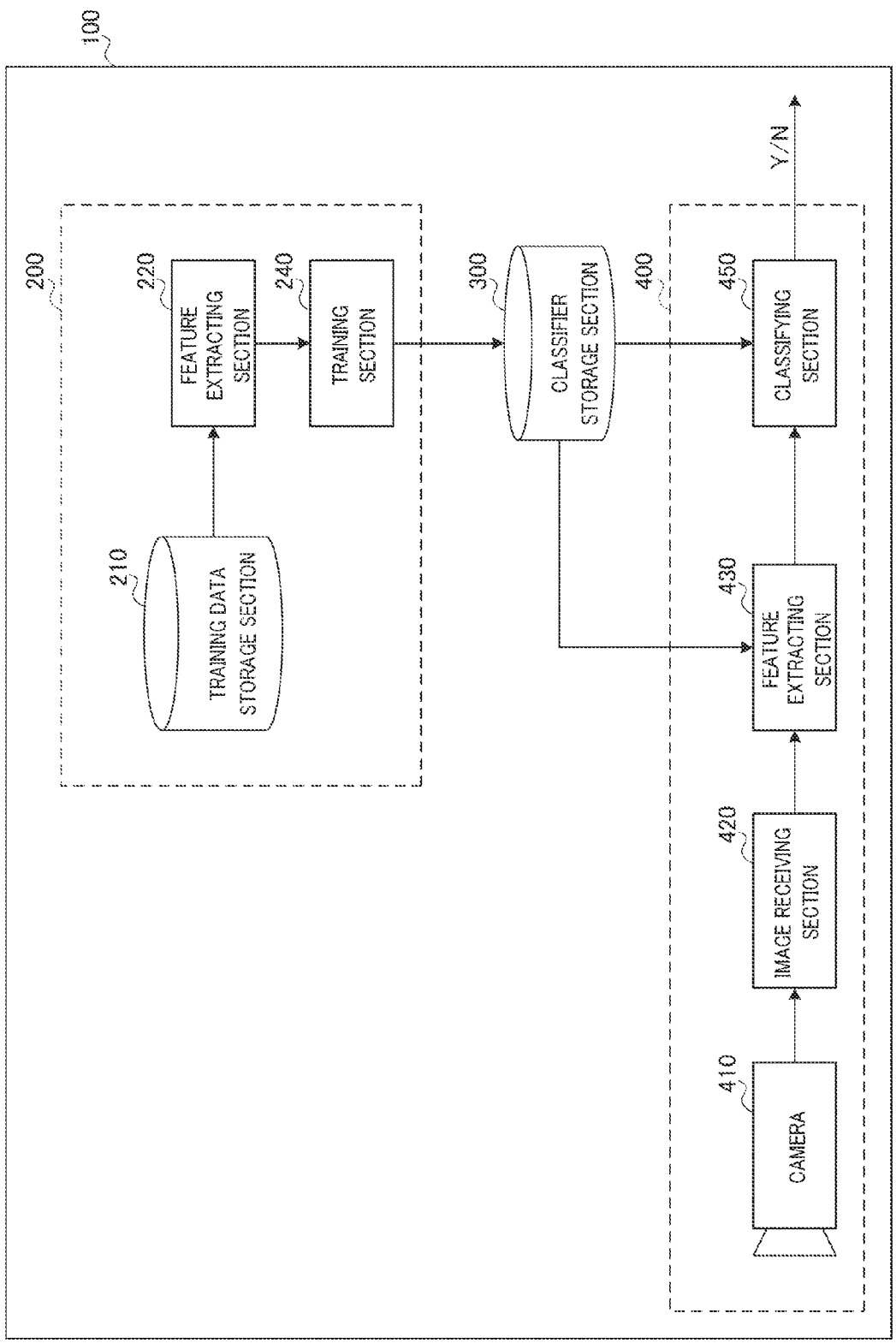
FIG. 2 is a system block diagram illustrating an example of the configuration of an object detecting system including a feature extracting apparatus according to Embodiment 2.

FIG. 2 is a system block diagram illustrating an example of the configuration of the object detecting system including the feature extracting apparatus according to the present embodiment. FIG. 2 also illustrates the configuration of each apparatus.

Object detecting system 100 of FIG. 2 includes classifier training apparatus 200, classifier storage section 300, and object detecting apparatus 400. Classifier training apparatus 200 and object detecting apparatus 400 are each connectable to classifier storage section 300 via a communication network such as the Internet.

In the present embodiment, classifier training apparatus 200 uses, for example, the Boosting method as a machine learning method. Classifier training apparatus 200 generates a classifier for detection of a target object (hereinafter, referred to as "detection target object") from images normalized for training in advance (hereinafter, referred to as "training images"). Classifier training apparatus 200 then stores the generated classifier in classifier storage section 300.

Classifier training apparatus 200 includes training data storage section 210, feature extracting section 220 having the feature extracting apparatus according to the present invention, and training section 240.

Training data storage section 210 previously stores multiple training images including detection target objects (positive samples), multiple training images including no detection target objects (negative samples) therein, and a candidate region information for feature extraction.

Feature extracting section 220 acquires a feature extraction region for each training image stored in training data storage section 210, and extracts an image feature from the acquired feature extraction region.

The feature extraction region is an image region targeted for the extraction of an image feature. For example, if a detection target is a human face, the feature extraction regions may be a large number of randomly placed image regions including parts (for example, eyes and a nose) of a human face. If the detection target is the whole body of a human, the feature extraction regions may be a large number of randomly placed image regions including parts (for example, a head, arms, and feet) of a human body.

Feature extracting section 220 extracts an image feature from each feature extraction region and outputs the extracted image features to training section 240. More specifically, feature extracting section 220 generates an LBP so that each of all the pixels or partial pixels in each feature extraction region is set as a pixel of interest. Feature extracting section 220 then generates a histogram indicating the distribution of the generated LBPs (hereinafter, simply referred to as "histogram") as an image feature of the feature extraction region.

The LBP is information indicating whether differences in pixel values between a pixel of interest and its surrounding neighbor pixels are each equal to or greater than a predetermined threshold, using bit values. The LBP in the present embodiment will be described below in detail.

Training section 240 generates one or more classifiers on the basis of a histogram group acquired from positive samples and a histogram group acquired from negative samples. The classifier is used to distinguish an image including a detection target object from an image including no detection target object. Training section 240 then transmits the generated classification information with the feature extraction region information to classifier storage section 300 and stores these information items in association with each other in classifier storage section 300.

That is, training section 240 chooses an optimal feature extraction region information item as a classifier from among the previously prepared multiple feature extraction region information items, through machine learning. Furthermore, training section 240 generates classification information corresponding to the chosen feature extraction region information as classifiers. The feature extraction region information indicates an area of a feature extraction region and includes the position and size of the feature extraction region, for example. The classification information is used to evaluate the histogram of the feature extraction region of a target image to determine whether the target image includes a predetermined object.

Training section 240 generates a classifier corresponding to a histogram generated on the basis of three histograms described below, and stores the generated classifier in classifier storage section 300.

Object detection apparatus 400 detects an object in an image targeted for object detection (hereinafter, referred to as "target image") using a classifier stored in classifier storage section 300. Object detecting apparatus 400 includes camera 410, image receiving section 420, feature extracting section 430 having a feature extracting apparatus according to the present invention, and classifying section 450.

Camera 410 takes a target image through a lens (not illustrated) and outputs the target image to image receiving section 420. The image quality of an image taken through a lens is influenced by the spatial frequency characteristics of the lens. The spatial frequency characteristics of a lens are represented by MTF (Modulation Transfer Function) characteristics. The MTF is information indicating what degree of contrast is reproduced at which frequency.

Figure 3:
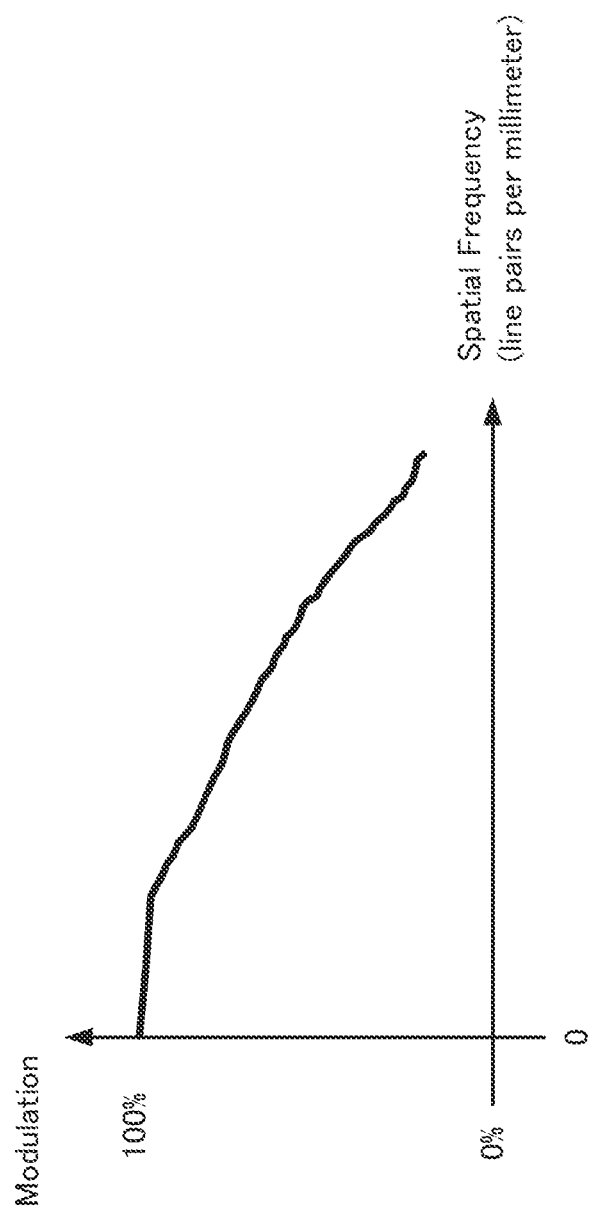
FIG. 3 illustrates an example of the MTF characteristics of a lens in Embodiment 2.

FIG. 3 illustrates an example of the MTF characteristics of a lens. In FIG. 3, a horizontal axis represents a spatial frequency, and a vertical axis represents the contrast reproduction ratio of a signal output from the lens.

A lens usually has the spatial frequency characteristics of a low pass filter as illustrated in FIG. 3. Therefore, the components in a high frequency are filtered in an image taken through the lens. As a result, in an image taken through a lens, even if two pixels actually have a large intensity difference in an object to be imaged, the two pixels at a short distance from each other have the almost same intensity.

That is, in a target image acquired by object detection apparatus 400, the maximum distance that can be considered to have the same intensity exists on the basis of the spatial frequency characteristics of the lens of camera 410. Hereinafter, the maximum distance that can be considered to have the same intensity on the basis of the spatial frequency characteristics of the lens is referred to as "equal intensity distance." In the present embodiment, the equal intensity distance is a distance of one pixel.

Image receiving section 420 in FIG. 2 scans a target image with a window having a predetermined size and outputs the individual scanned image regions (hereinafter, referred to as "window regions") to feature extracting section 430.

Feature extracting section 430 acquires a region information within each window region, indicated by the feature extraction region information stored in classifier storage section 300, as a feature extraction region.

Feature extracting section 430 then extracts an image feature from each feature extraction region and outputs the extracted image features to classifying section 450. More specifically, feature extracting section 430 generates an LBP for each pixel in a feature extraction region and generates a histogram of LBPs as an image feature of the feature extraction region.

The position of each pixel of the comparison target pixel group used by feature extracting section 430 for generation of LBPs is set so as to acquire brightness difference information in multiple directions in consideration of the above-described spatial frequency characteristics of the lens. That is, the position of each pixel of the comparison target pixel group is designed so as to allow for extraction of both the above-described microscopic information and macroscopic information.

The processing performed by feature extracting section 430 on a window region is similar to the processing performed by feature extracting section 220 in classifier training apparatus 200 described above on training images.

That is, feature extracting section 220 in classifier training apparatus 200 acquires, for example, all of a large number of regions previously prepared as candidate regions, as feature extraction regions. In contrast, feature extracting section 430 acquires only a region indicated by the feature extraction region information already chosen by training section 240 from classifier storage section 300, as a feature extraction region. Thus, a description of the configuration and operation of one of the sections will be substituted for that of the other to avoid duplication of the description.

Figure 4:
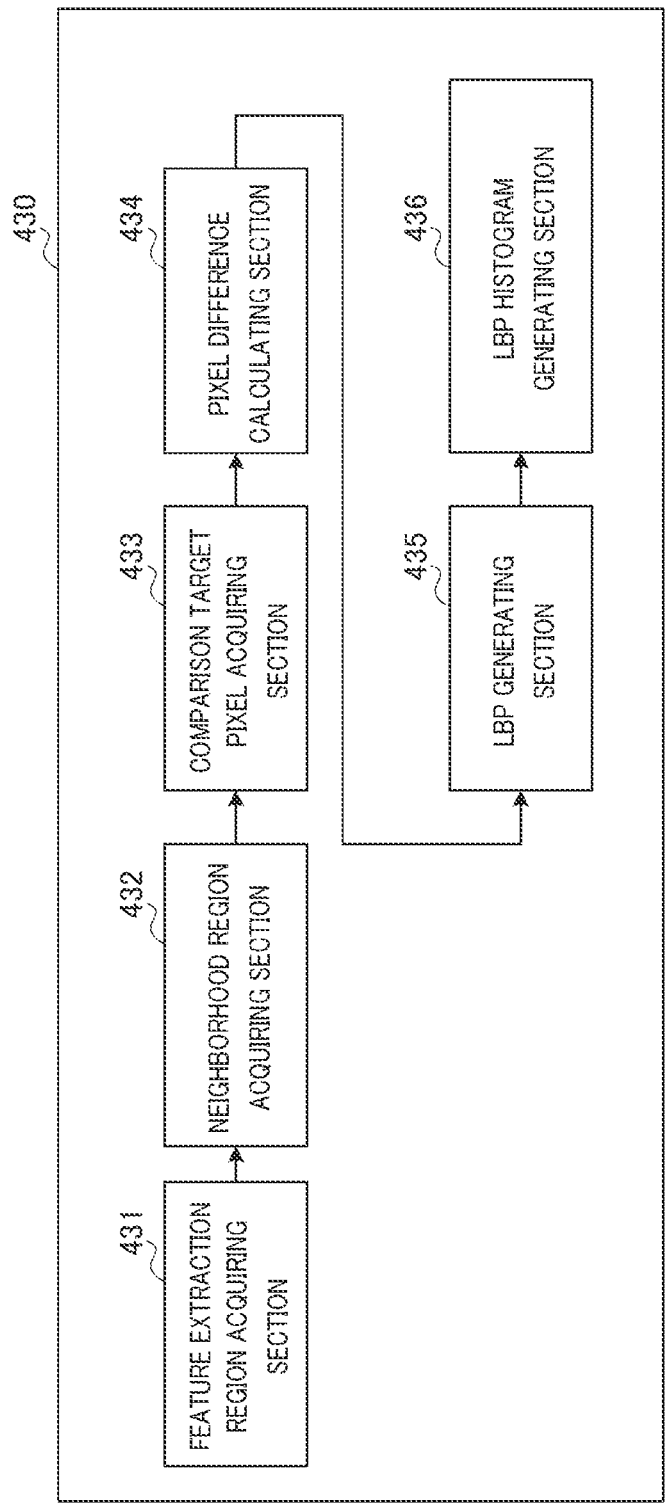
FIG. 4 is a block diagram illustrating an example of the configuration of a feature extracting section according to Embodiment 2.

FIG. 4 is a block diagram illustrating an example of the configuration of feature extracting section 430.

In FIG. 4, feature extracting section 430 includes feature extraction region acquiring section 431, neighborhood region acquiring section 432, comparison target pixel acquiring section 433, pixel difference calculating section 434, LBP generating section 435, and LBP histogram generating section 436.

Feature extraction region acquiring section 431 acquires a feature extraction region in each window region received from image receiving section 420. More specifically, feature extraction region acquiring section 431 acquires a range within each window region, indicated by the feature extraction region information stored in classifier storage section 300, as a feature extraction region. The acquired feature extraction region is then output to neighborhood region acquiring section 432.

Neighborhood region acquiring section 432 shifts a pixel of interest to the next one for each of all the pixels or partial pixels in the feature extraction region. Neighborhood region acquiring section 432 acquires a neighborhood region for each pixel of interest. More specifically, neighborhood region acquiring section 432 acquires multiple annular regions having a pixel of interest at their center and having different distances from the pixel of interest, as neighborhood regions. Neighborhood region acquiring section 432 then outputs the acquired neighborhood region to comparison target pixel acquiring section 433.

Comparison target pixel acquiring section 433 acquires the pixel values of multiple pixels from each neighborhood region input from neighborhood region acquiring section 432, and outputs the acquired pixel values to pixel difference calculating section 434. Hereinafter, a pixel having a pixel value acquired from comparison target pixel acquiring section 433 is referred to as "comparison target pixel."

The comparison target pixel group is placed so that no comparison target pixel included in another neighborhood region is positioned on a straight line connecting a comparison target pixel included in any neighborhood region and the pixel of interest. That is, comparison target pixel acquiring section 433 extracts intensity difference information about the direction of the number depending on the number of neighborhood regions (multiple number of the number of neighborhood regions).

Figure 5:
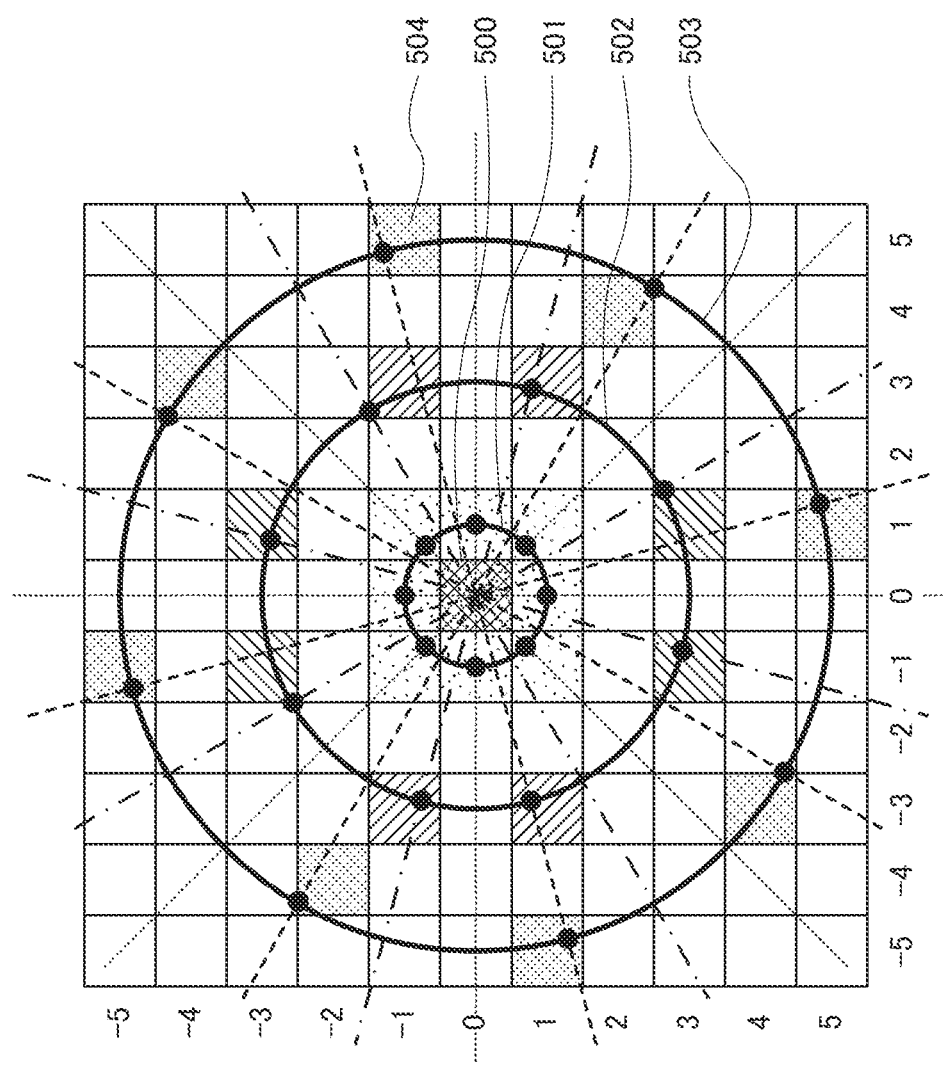
FIG. 5 illustrates how a neighborhood region and a comparison target pixel group are placed in Embodiment 2.

FIG. 5 illustrates how the neighborhood region and the comparison target pixel group are placed in the present embodiment.

As illustrated in FIG. 5, in the present embodiment, neighborhood region acquiring section 432 acquires annular regions at distances of one, three, and five pixels from pixel of interest 500. These three annular regions are hereinafter referred to as first to third neighborhood regions 501 to 503, respectively. That is, the distance between first neighborhood region 501 and second neighborhood region 502 is a distance of two pixels. The distance between second neighborhood region 502 and third neighborhood region 503 is also a distance of two pixels. In the drawing, each neighborhood region is indicated by an axial line (solid line).

Comparison target pixel acquiring section 433 then acquires eight equidistant comparison target pixels from each of first to third neighborhood regions 501 to 503 (pixels positioned on circles indicated by solid lines in FIG. 5), as indicated by shaded areas. Comparison target pixel 504 is an example of the comparison target pixels.

The distance between first neighborhood region 501 and second neighborhood region 502, and the distance between second neighborhood region 502 and third neighborhood region 503, which are acquired by neighborhood region acquiring section 432 are each larger than the equal intensity distance.

Moreover, the distance between the comparison target pixels, which are acquired by comparison target pixel acquiring section 433, in each region of second neighborhood region 502 and third neighborhood region 503 is larger than the equal intensity distance (one pixel).

Eight of multiple pixels acquired by comparison target pixel acquiring section 433 are placed at the equal distance in each neighborhood region.

Moreover, the position of comparison target pixel 504 acquired by comparison target pixel acquiring section 433 is determined so as to have directions viewed from the pixel of interest, the directions being different from the directions of comparison target pixels in other neighborhood regions.

On the basis of these placement rules, the direction of each comparison target pixel to the pixel of interest is shifted for each neighborhood region. Thereby, the direction used for the intensity difference calculation for the feature extraction (that is, the direction for extracting intensity difference information) increases to the multiple number of the number of neighborhood regions. That is, in the present embodiment, three neighborhood regions are used to further shift the direction of a comparison target pixel. Accordingly, intensity difference information in directions of 3×8=24 is extracted to increase the information amount included in image features to be extracted. Therefore, the LBPs generated from the comparison target pixel group having such placement are a feature with high classification performance. A specific example of the technique for determining the position of a comparison target pixel group as illustrated in FIG. 5 will be described below.

Let us suppose a case where the direction of a comparison target pixel group is shifted for each neighborhood region. In FIG. 5 in this case, for example, comparison target pixel acquiring section 433 may divide the angle between comparison target pixels included in neighborhood region 501 nearest to pixel of interest 500, by the number of the neighborhood regions. Then, comparison target pixel acquiring section 433 may also set the direction shifted by the divided angle as the direction of the intensity difference of the other neighborhood regions. More specifically, for example, comparison target pixel acquiring section 433 sets the angle between the comparison target pixels included in neighborhood regions 501 to be 45 degrees, and sets the number of neighborhood regions 501 to 503 to be three. Comparison target pixel acquiring section 433 places comparison target pixels so that the direction of an angle of 15 degrees obtained by dividing an angle of 45 degrees by the number of the neighborhood regions is the direction of the intensity difference of neighborhood region 502. Comparison target pixel acquiring section 433 then places comparison target pixels so that the direction of an angle of 30 degrees is the direction of the intensity difference of neighborhood region 503.

Pixel difference calculating section 434 in FIG. 4 calculates the difference between the pixel value of each pixel of interest and the pixel value of a comparison target pixel. More specifically, image difference calculating section 434 calculates the difference between each pixel value of the eight comparison target pixels input from comparison target pixel acquiring section 433 and the pixel value of the pixel of interest for each of the first to third neighborhood regions. Image difference calculating section 434 then outputs the calculated difference to LBP generating section 435. That is, the values of the eight differences are output for each combination of pixels and a neighborhood region.

LBP generating section 435 generates an LBP for each combination of pixels and a neighborhood region. In other words, this LBP is information indicating whether each of the input differences is equal to or greater than the predetermined threshold, using a bit value. More specifically, LBP generating section 435 generates a code in which eight bit values indicating whether the respective input differences are each equal to or greater than a predetermined threshold are placed in a predetermined order for each of the above-described combinations, as an LBP. That is, LBP generating section 435 generates three LBPs (eight bit value) when setting each pixel as a pixel of interest. LBP generating section 435 then outputs the three generated LBPs to LBP histogram generating section 436.

LBP histogram generating section 436 generates a histogram indicating the distribution of the LBPs generated from the image. More specifically, LBP histogram generating section 436 generates three histograms corresponding to first to third neighborhood regions 501 to 503 (see FIG. 5), respectively, for each feature extraction region. These three histograms are connected to form one histogram as a whole. LBP histogram generating section 436 then outputs the generated histogram to classifying section 450 in FIG. 2.

Classifying section 450 in FIG. 2 acquires classification information stored in classifier storage section 300. Classifying section 450 uses the acquired classification information to determine whether the target image includes a detection target object on the basis of the three histograms generated from each feature extraction region of the window regions scanned by image receiving section 420. Classifying section 450 then notifies the user of the results of determination through an image display apparatus and/or a voice output apparatus (not illustrated), for example.

For example, classifier training apparatus 200 and object detecting apparatus 400 may be configured to be a computer including a CPU and a storage medium such as a RAM. In this case, classifier training apparatus 200 and object detecting apparatus 400 operate in response to the execution of a stored control program by the CPU. Object detecting apparatus 400 may also be a dedicated chip for the calculation. Classifier storage section 300 is, for example, a network server including storage media such as semiconductor memory and a hard disk.

Such object detecting system 100 can generate LBPs for each pixel in both a training stage and an object detection stage from a comparison target pixel group included in multiple annular regions. This can extract a feature with high classification performance as an LBP, the feature including both microscopic information and macroscopic information. This LBP can be used for the object detection.

Object detecting system 100 can generate LBPs from the comparison target pixel group placed in consideration of the spatial frequency characteristic of the lens. Thereby, object detecting system 100 can avoid acquiring many pixel values at an unnecessarily near distance in consideration of the spatial frequency characteristics of the lens, and using for a calculation, and can perform the above-described object detection with a reduced processing load.

That is, object detecting system 100 can extract a feature with high classification performance to detect an object more accurately while reducing an increase in a processing load. Thereby, object detecting system 100 can accurately detect an object from an image at high speed while reducing a calculation cost.

The description of the configuration of object detecting system 100 has been given thus far.

A specific example of the technique for determining the placement of the comparison target pixel group will be described below.

The spatial frequency characteristics of a lens usually differ depending on cameras. However, the difference in pixel values between adjacent pixels in a taken image is small irrespective of the kind of camera. Therefore, the distance between comparison target pixels is preferably set to a larger distance than the equal intensity distance. That is, the distance between comparison target pixels is preferably set to two pixels or four pixels at a maximum. This is because, even if comparison target pixels at a distance equal to or less than the equal intensity distance is chosen, the pixel values are almost the same, and feature extraction processes are repeated for the same information. If comparison target pixels are utilized at a larger distance than the equal intensity distance, the amount of calculation of feature extraction and the dimension number of a feature can be reduced while the information amount is increased.

Additionally, the placement of a comparison target pixel group is preferably determined also in consideration of the distance between comparison target pixels between multiple neighborhood regions, on the basis of the above-mentioned characteristic that is "the difference in pixel values between adjacent pixels is small."

Let us suppose that the distance (radius) from the pixel of interest of a neighborhood region is R, and the number of the comparison target pixels in one neighborhood region is P (eight in the present embodiment). For example, the coordinates of the p-th comparison target pixel without consideration of the spatial frequency characteristics of a lens and the number of directions of intensity difference information can be determined using Equation 1.

[1]
$$\left(R\cos\left(\frac{2\pi p}{P}\right), R\sin\left(\frac{2\pi p}{P}\right)\right) \quad \text{(Equation 1)}$$

On the other hand, in the case of the first to third neighborhood regions illustrated in FIG. 5, the coordinates of each pixel in the comparison target pixel group used by object detecting system 100 are determined, for example, using Equation 2. In this example, n takes n=0, 1, 2 in the order of the first to third neighborhood regions, respectively, illustrated in FIG. 5.

[2]
$$\left(R_n\cos\left(\frac{2\pi}{P}*\left(p+\frac{n}{3}\right)\right), R_n\sin\left(\frac{2\pi}{P}*\left(p+\frac{n}{3}\right)\right)\right) \quad \text{(Equation 2)}$$

Equation 2 is used for first to third neighborhood regions 501 to 503 illustrated in FIG. 5 to thereby place a comparison target pixel group shifted by a constant angle between neighborhood regions as illustrated in FIG. 5 so that intensity differences can be calculated from different directions.

Comparison target pixel acquiring section 433 may calculate and determine the placement of the comparison target pixel group using Equation 2, and may determine the placement according to a previously prepared placement.

If the distance of a neighborhood region is excessively long, the distance from the pixel of interest increases, and the pixel of interest and a comparison target pixel are less likely to be included in a detection target object. As a result, if the distance of a neighborhood region is excessively long, the extracted image feature is less appropriate as an image feature of a detection target object, and the classification performance between the detection target object and objects other than the detection target object is more likely to decrease.

As described the above, the distance between multiple neighborhood regions and the distance between multiple comparison target pixels in each neighborhood region are preferably longer than the equal intensity distance at which pixels can be considered to have the same intensity on the basis of the spatial frequency characteristics of the lens, within a region included in the detection target object. The distance between adjacent neighborhood regions is preferably a distance of one, two, three, or four pixels. However, when the MTF characteristics of a lens are the low pass filter characteristics shifted to a lower frequency band (when being attenuated rapidly), the distance may be, for example, four or more pixels.

That is, the position of a comparison target pixel group used for the generation of an LBP is preferably determined so that intensity difference information can be extracted from multiple directions in consideration of the spatial frequency characteristics of the lens.

The description of the specific example of the technique for determining the placement of the comparison target pixel group has been given thus far.

The operation of object detecting apparatus 400 in object detecting system 100 will be described next. Note that the operation of feature extracting section 220 in classifier training apparatus 200 is the same as that of feature extracting section 430 in object detecting apparatus 400; hence, a redundant description will be omitted.

Figure 6:
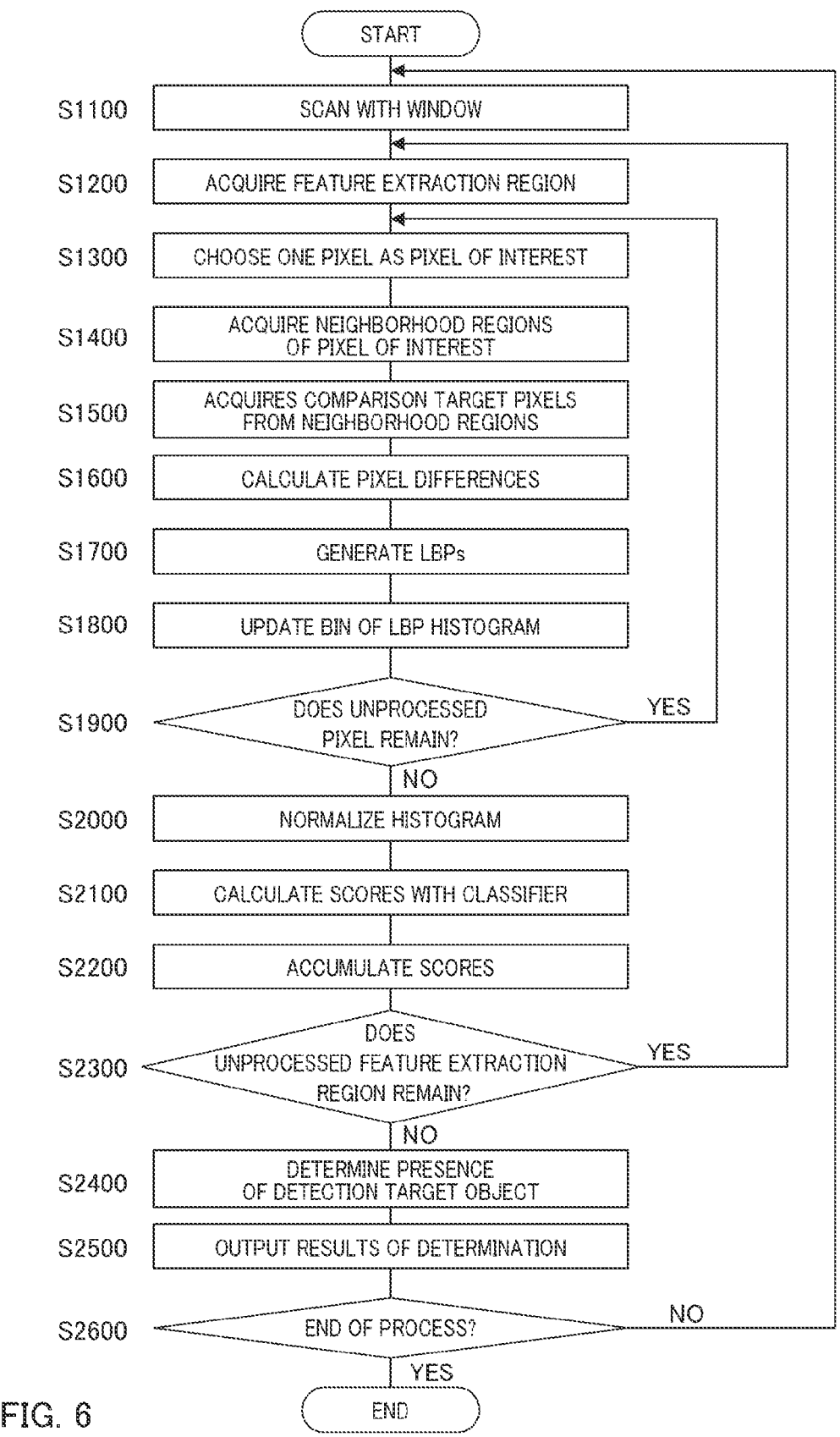
FIG. 6 is a flow chart illustrating an example of the operation of an object detecting apparatus in Embodiment 2.

FIG. 6 is a flow chart illustrating an example of the operation of object detecting apparatus 400.

In step S1100, image receiving section 420 scans a target image with a window having a predetermined size.

Figure 7:
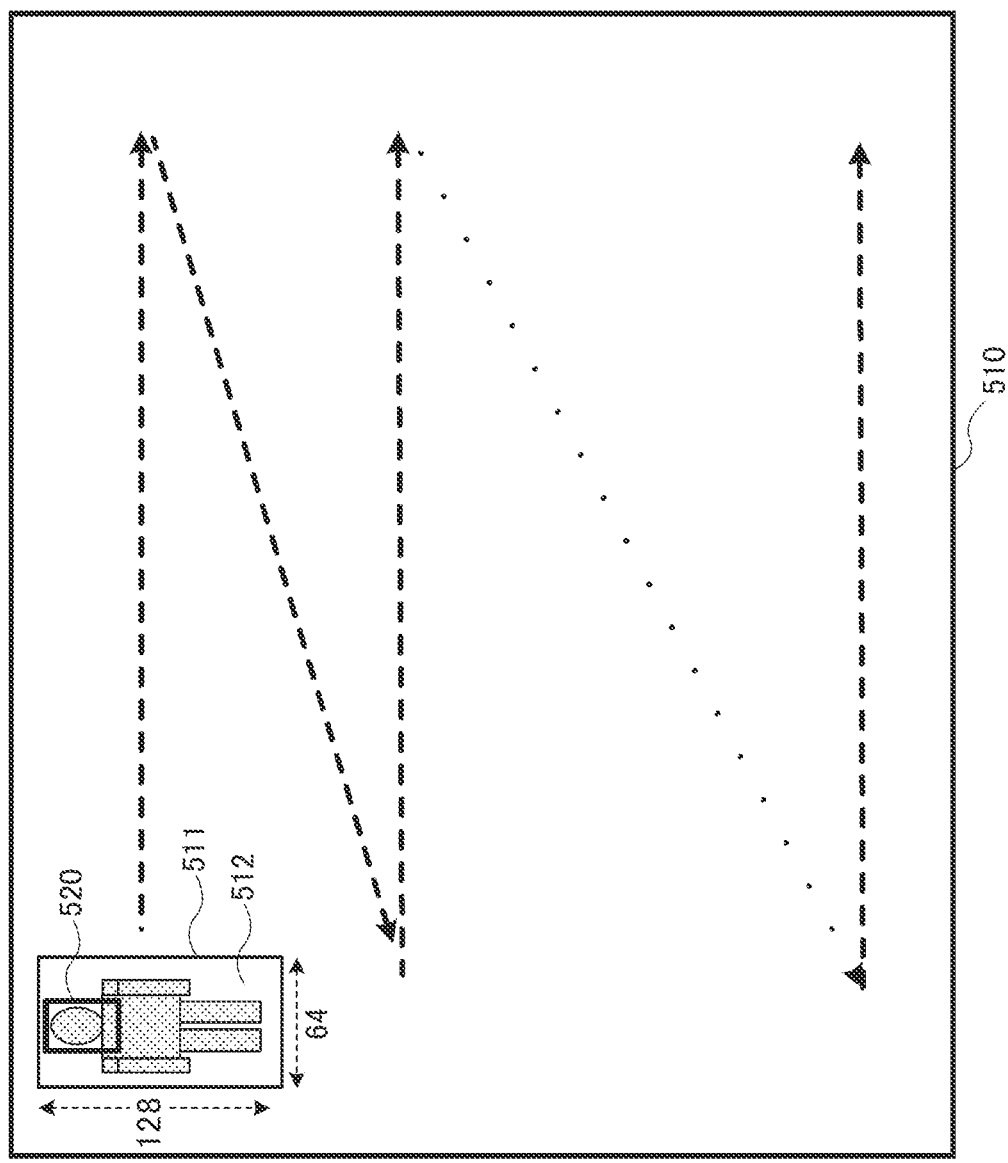
FIG. 7 is a schematic diagram illustrating an example of scanning in Embodiment 2.

FIG. 7 is a schematic diagram illustrating an example of the scanning.

Image receiving section 420 scans entire target image 510 with window 511 having a predetermined size to obtain window regions 512 at various positions, as illustrated in FIG. 7. The size of window 511 is 64×128 pixels, for example.

In step S1200 of FIG. 6, feature extraction region acquiring section 431 acquires one item of the feature extraction region information (e.g., a position and a size) obtained by training of classifier training apparatus 200 and stored in classifier storage section 300. Feature extraction region acquiring section 431 extracts a feature extraction region on the basis of the position and size indicated by the acquired feature extraction region information. For example, as illustrated in FIG. 7, feature extraction region acquiring section 431 acquires a rectangular region including a human head as feature extraction region 520, from window region 512.

In step S1300, neighborhood region acquiring section 432 chooses one pixel from feature extraction region 520 as a pixel of interest.

In step S1400, neighborhood region acquiring section 432 determines first to third neighborhood regions 501 to 503 (see FIG. 5) having the pixel of interest centered around the regions.

In step S1500, comparison target pixel acquiring section 433 acquires eight comparison target pixels 504 (see FIG. 5) from each of first to third neighborhood regions 501 to 503.

The positions of multiple neighborhood regions and the position of a comparison target pixel group are determined so that intensity difference information is acquired from as many directions as possible in consideration of the spatial frequency characteristics of the camera as described above. Neighborhood region acquiring section 432 chooses an unchosen pixel each time the process returns to step S1300 after the determination process in step S1900 described later, resulting in pixel-wise shifting of the position of a pixel to be acquired as a comparison target pixel (the position of a neighborhood region).

Figure 8:
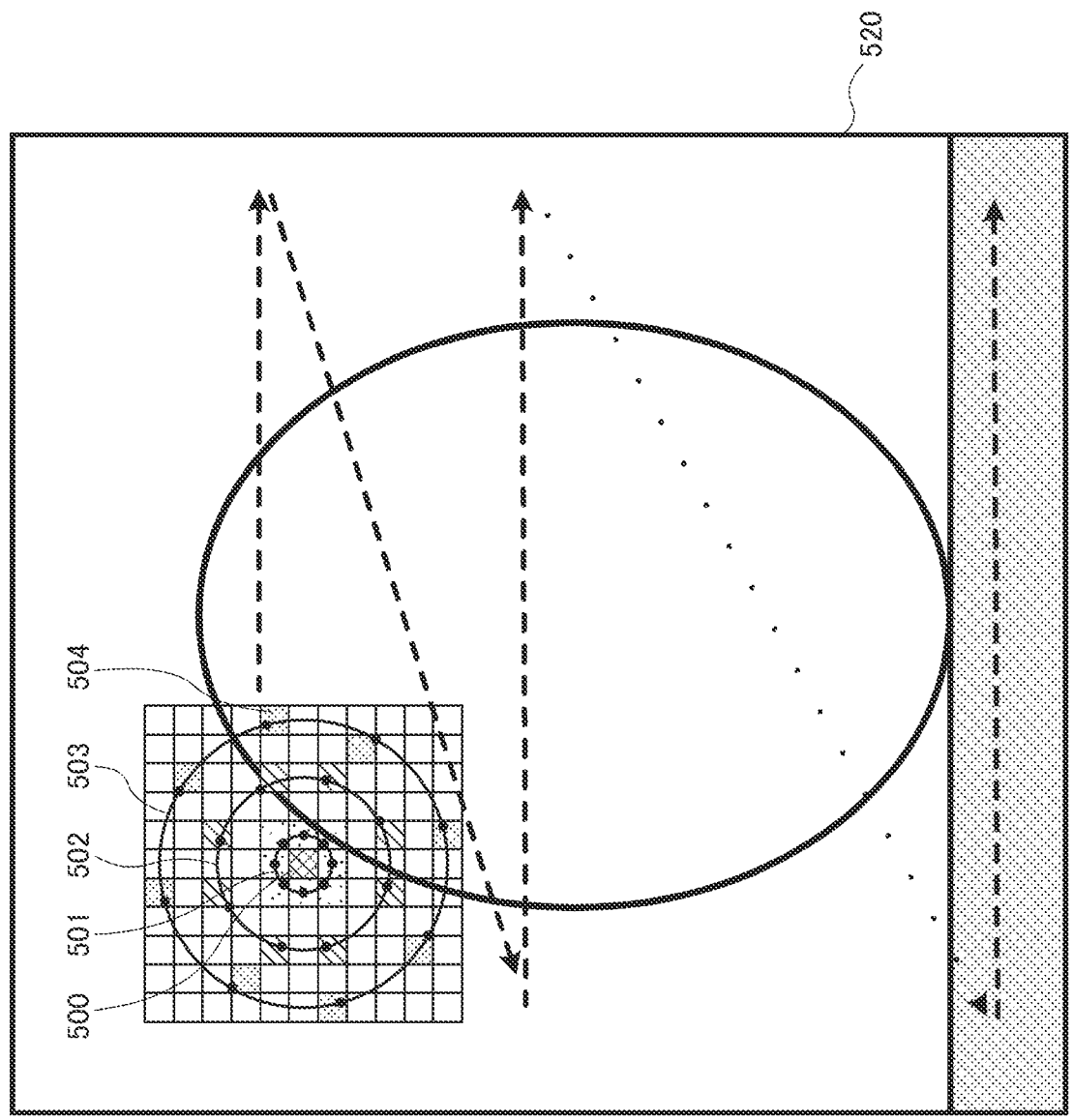
FIG. 8 is a schematic diagram illustrating an example of the shifting of a pixel of interest and the neighborhood region of the pixel of interest in a feature extraction region in Embodiment 2.

FIG. 8 is a schematic diagram illustrating an example of the shifting of a pixel of interest and the neighborhood region of the pixel of interest in the feature extraction region.

Neighborhood region acquiring section 432 shifts the position of a pixel chosen as pixel of interest 521 within the entire of feature extraction region 520, as illustrated in FIG. 8. In the present embodiment, each time pixel of interest 500 is shifted, first to third neighborhood regions 501 to 503 (and eight comparison target pixels 504 in each neighborhood region) are determined one after another in the entirety of feature extraction region 520 in step S1400 of FIG. 6.

In step S1600, pixel difference calculating section 434 calculates the difference between each comparison target pixel and the pixel of interest for each neighborhood region. In the present embodiment, eight difference values are acquired for each neighborhood regions.

In step S1700, LBP generating section 435 binarizes the difference values between the pixel of interest acquired in step S1600 and comparison target pixels of each neighborhood region to generate three 8-bit LBPs.

Lest us suppose that the intensity value of the pixel of interest is represented by "$g_c$," the number of comparison target pixels (eight in the present embodiment) is represented by "P," the sequence number of a comparison target pixel is represented by "p," the pixel average value of the p-th comparison target pixel is represented by "$g_p$," and the number of pixels corresponding to the distance between the comparison target pixel and the pixel of interest (one, three, and five in the present embodiment) is represented by "R." In this case, $LBP_{P,R}$ is expressed by Equation 3, for example.

[3]

$$LBP_{P,R} = \sum_{p=0}^{P-1} s(g_p - g_c)2^p, \quad s(x) = \begin{cases} 1, & x \geq 0 \\ 0, & x < 0 \end{cases} \quad \text{(Equation 3)}$$

In step S1800, LBP histogram generating section 436 adds one to the bin corresponding to $LBP_{P,R}$ configuring the histogram.

In step S1900, neighborhood region acquiring section 432 determines whether an unprocessed pixel remains in the feature extraction region. If neighborhood region acquiring section 432 determines that an unprocessed pixel remains (S1900: Yes), the process returns to step S1300 to choose the unprocessed pixel and repeats the same process flow. If neighborhood region acquiring section 432 has processed all the pixels in the entire feature extraction region (S1900: No), the process proceeds to step S2000.

Figure 9:
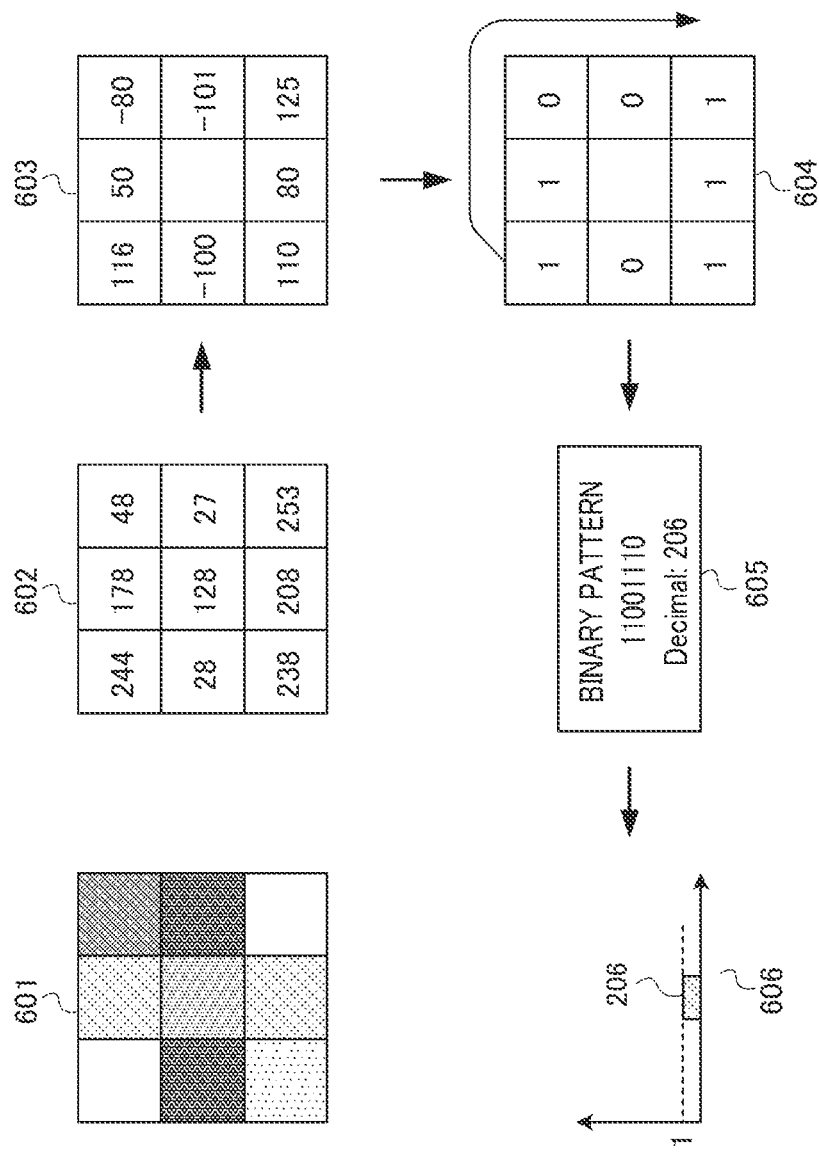
FIG. 9 is a schematic diagram summarizing an example of a process of generating a histogram in Embodiment 2.

FIG. 9 is a schematic diagram summarizing an example process until the LBP of a certain neighborhood region is reflected on a histogram (the process of generating a histogram).

It is assumed that numerical value set 602 including nine values is acquired about neighborhood region 601 with R=1 of neighborhood region 523, as illustrated in FIG. 9. Numerical value set 602 includes intensity value $g_c$ of a pixel of interest is "128," and intensity values $g_p$ of the comparison target pixels (one pixel in the case of R=1) are [244, 178, 48, 27, 253, 208, 238, 28]. It is assumed that intensity value $g_p$ is sequentially acquired from the upper left one of the neighbor pixels in a clockwise direction. In this case, numerical value set 603 consists of differences ($g_p$-$g_c$) [116, 50, -80, -101, 125, 80, 110, -100]. When an assumption is made that the binarization threshold is "0," numerical value set 604 acquired by binarizing the differences results in [1, 1, 0, 0, 1, 1, 1, 0]. LBP 605 results in "11001110" ("206" in decimal).

LBP histogram generating section 436 adds one to bin "206" of histogram 606.

Such repetitive addition to corresponding bins eventually leads to a histogram indicating a feature of the feature extraction region image. Assuming that the maximum number of LBPs acquired from a feature extraction region having a size of I×J is K, histogram H(k) is expressed by Equation 4.

[4]

$$H(k) = \sum_{i=1}^{I} \sum_{j=1}^{J} f(LBP_{P,R}(i,j), k), \quad k \in [0, K], \quad \text{(Equation 4)}$$

where $$f(x, y) = \begin{cases} 1, & \text{if } x = y \\ 0, & \text{otherwise} \end{cases}$$

In step S2000 of FIG. 6, histogram generating section 436 normalizes the histogram to a feature value independent of the size of the feature extraction region. Specifically, histogram generating section 436 normalizes the histogram using the sum of the values of all the bins in the histogram, for example. Assuming that the number of bins is represented by N and the value of the i-th bin is represented by $H_i$ (i=1, 2, . . . , N), the sum of bin values $SumH_i$ is expressed by Equation 5.

[5]

$$SumH_i = \sum_{i=1}^{N} H_i \quad \text{(Equation 5)}$$

Value $H_i'$ of the i-th bin in the normalized histogram is expressed by Equation 6.

[6]

$$H_i' = \frac{H_i}{SumH_i} \quad \text{(Equation 6)}$$

Figure 10A:
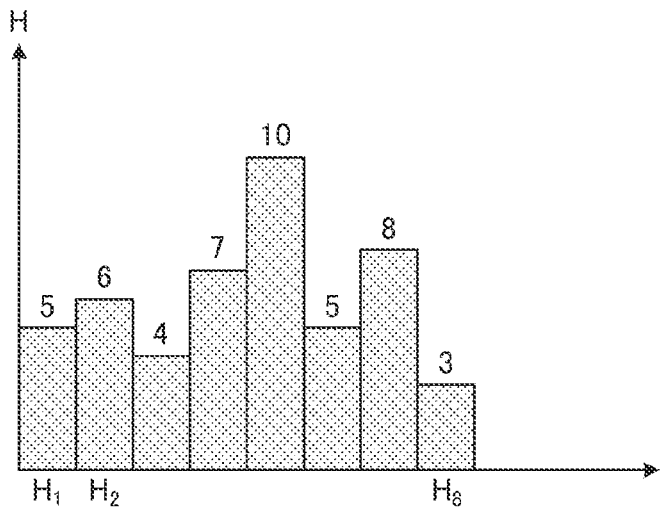
FIGS. 10A and 10B illustrate an example of normalization of a histogram in Embodiment 2.
Figure 10B:
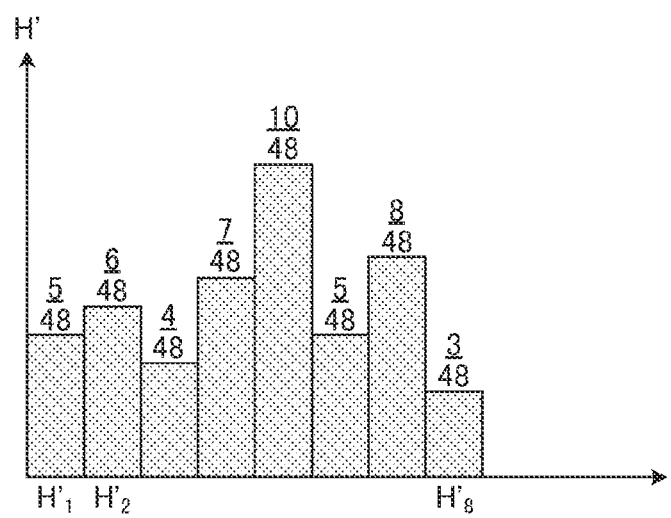

FIGS. 10A and 10B illustrate an example of normalization of a histogram.

It is assumed that the values of bins $H_1$, $H_2$, . . . , $H_8$ in a histogram before normalization are "5, 6, 4, 7, 10, 5, 8, 3" in this order, as illustrated in FIG. 10A. In this case, the sum of the bin values $SumH_i$ is calculated using Equation 7, resulting in values as illustrated in FIG. 10B.

[7]

$$SumH_i = \sum_{i=1}^{N} H_i = 5 + 6 + 4 + 7 + 10 + 5 + 8 + 3 = 48 \quad \text{(Equation 7)}$$

Values $H_1'$, $H_2'$, . . . , and $H_8'$ of the bins in the normalized histogram are calculated using Equation 8.

[8]

$$H_1' = \frac{H_1}{SumH_1} = \frac{5}{48} \quad \text{(Equation 8)}$$

$$H_2' = \frac{H_2}{SumH_2} = \frac{6}{48}$$

$$\vdots$$

$$H_8' = \frac{H_8}{SumH_8} = \frac{3}{48}$$

In step S2100, classifying section 450 acquires a classifier from classifier storage section 300 and calculates scores indicating likelihood used to determine whether a current feature extraction region includes the detection target object on the basis of the normalized histogram.

In step S2200, object detecting apparatus 400 accumulates the calculated scores.

In step S2300, feature extracting section 430 determines whether an unprocessed feature extraction region remains. Specifically, feature extracting section 430 determines whether this section has calculated scores of all of the feature extraction regions associated with the feature extraction region information stored in classifier storage section 300. If feature extracting section 430 determines that an unprocessed feature extraction region remains (S2300: Yes), the process returns to step S1200 to process the unprocessed feature extraction region. If feature extracting section 430 has processed all the feature extraction regions (S2300: No), the process proceeds to step S2400.

In step S2400, classifying section 450 determines whether each scanned window region includes the detection target object on the basis of the accumulated score. That is, if the score is equal to or greater than a predetermined threshold, classifying section 450 determines that the particular window includes the detection target object. Note that classifying section 450 may also perform the determination on the basis of a predetermined function of the score.

In step S2500, classifying section 450 outputs the results of determination of the object detection.

Classifying section 450 may also determine whether a designated object is included in a target image, or determine what object is included in the target image. In the former case, classifying section 450 may use only a classifier corresponding to the designated object and output information indicating whether the object is included. In the latter case, classifying section 450 may use classifiers one after another to repeat determination, and if an object is detected, output information indicating what object is detected.

In step S2600, image receiving section 420 determines whether the instruction to finish the process has been input by operation, for example. If image receiving section 420 has not received such an instruction (S2600: No), the process returns to step S1100 to perform the next scan or to process the next target image. If image receiving section 420 has received such an instruction (S2600: Yes), the section finishes the process.

In this manner, object detecting apparatus 400 can efficiently acquire comparison target pixels suitable for generating a feature including both microscopic information and macroscopic information in sufficient consideration of the lens spatial frequency characteristics of the camera. Object detecting apparatus 400 can then use the difference between each comparison target pixel and a pixel of interest, can generate the histogram of LBPs involving a small calculation amount, a small dimension number, and a large information amount, and can detect an object.

The description of operation of object detecting apparatus 400 has been given thus far.

Note that classifier training apparatus 200 also acquires comparison target pixels, generates a histogram of LBPs, and use the histogram as an image feature to generate a classifier for the object detection, although the description thereof is omitted.

The difference in the performance of object detection between the case of sufficient consideration of the lens spatial frequency characteristics of the camera as described above and the case without consideration thereof will be described below.

Figure 11:
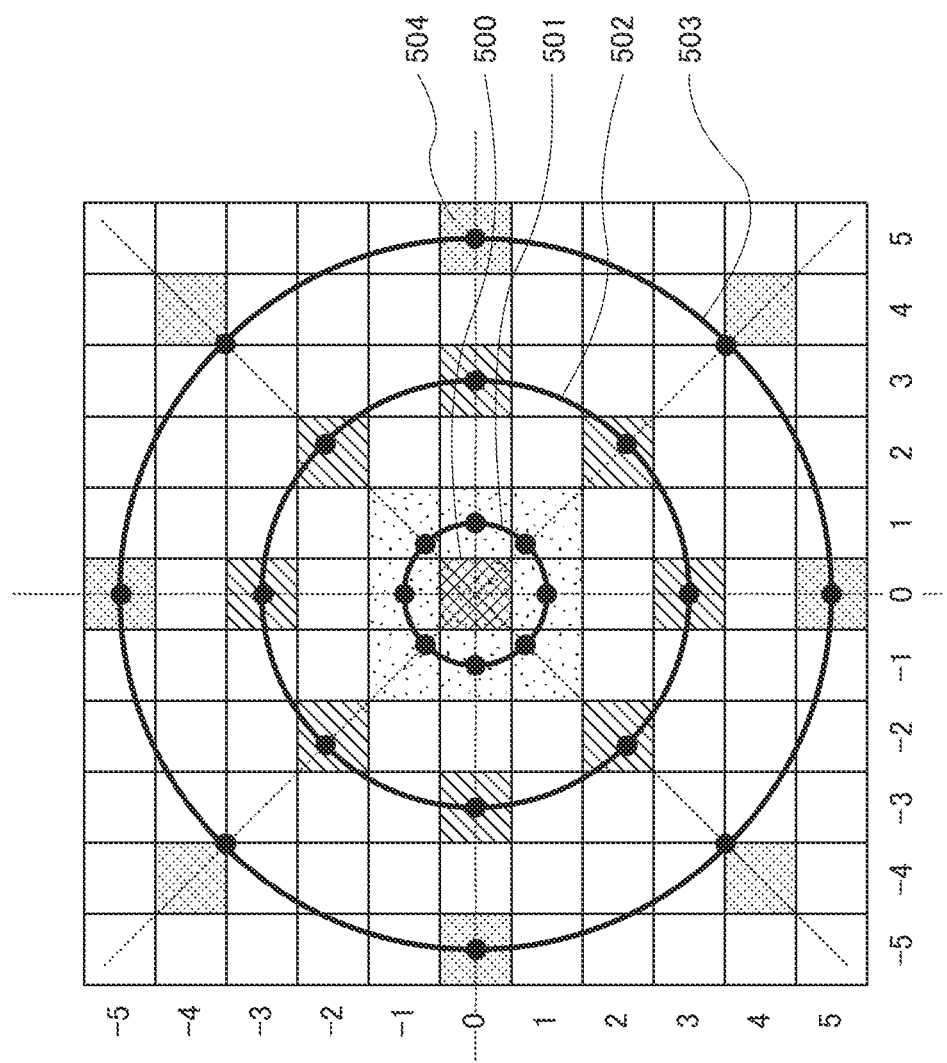
FIG. 11 illustrates an example of how comparison target pixel groups are placed without sufficient consideration of the lens spatial frequency characteristics of the camera and the number of directions of intensity difference information.
Figure 12:
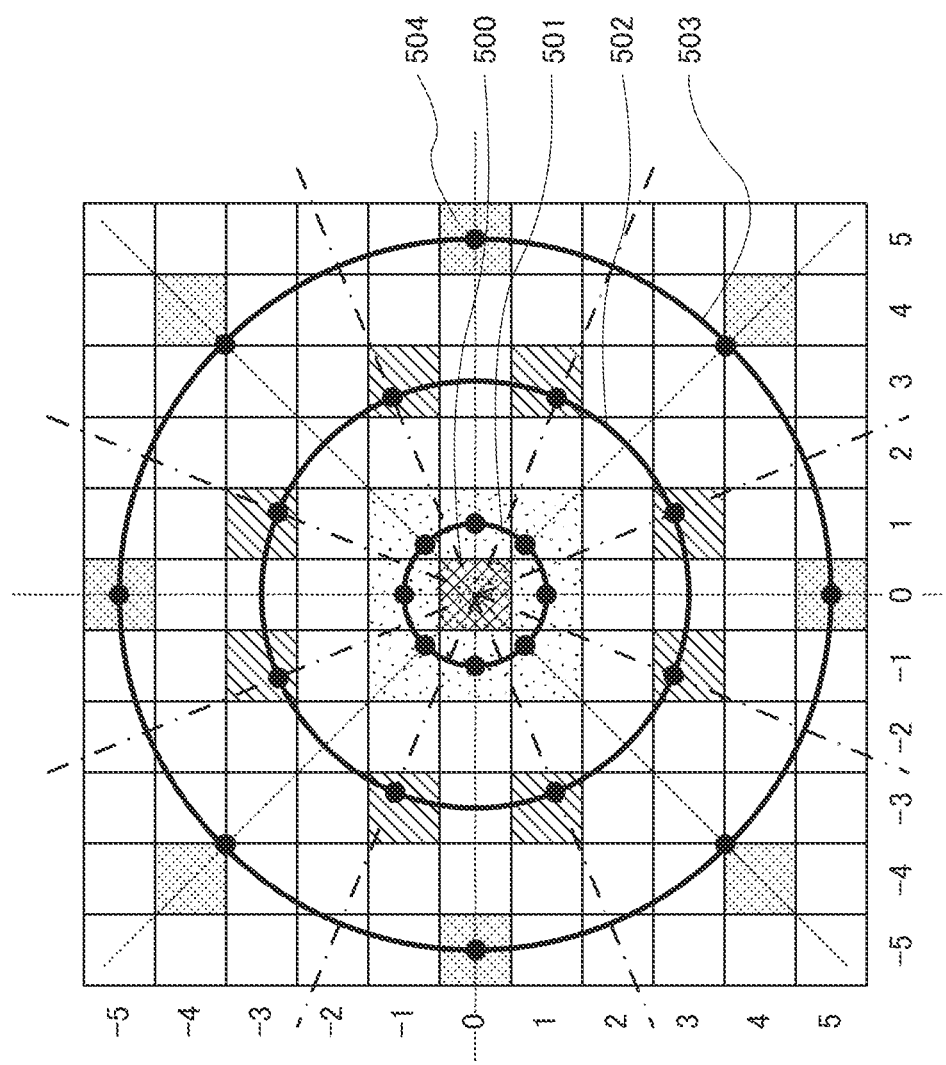
FIG. 12 illustrates another example of how comparison target pixel groups are placed without sufficient consideration of the lens spatial frequency characteristics of the camera and the number of directions of intensity difference information.

FIG. 11 and FIG. 12 each illustrate an example placement of comparison target pixel groups without sufficient consideration of the lens spatial frequency characteristics of the camera.

In the example illustrated in FIG. 11, although the positions of the first to third neighborhood regions are the same as those in FIG. 5, the positions of multiple comparison target pixels 504 are different from those in FIG. 5. In FIG. 11, multiple comparison target pixels 504 are positioned in the same direction with respect to pixel of interest 500 between first to third neighborhood regions 501 to 503. The placement illustrated in FIG. 11 is calculated using, for example, Equation 1 described above.

In the example illustrated in FIG. 12, multiple comparison target pixels 504 are positioned at angles shifted by 22.5 degrees between second neighborhood region 502 and first and third neighborhood regions 501 and 503. In the example illustrated in FIG. 12, multiple comparison target pixels 504 are also positioned at the same angles between first neighborhood regions 501 and third neighborhood region 503. That is, the comparison target pixel group involves intensity difference information extracted only from 16 (2×8) directions instead of 24 (3×8) directions as the entireties of first to third neighborhood regions 501 to 503.

Figure 13:
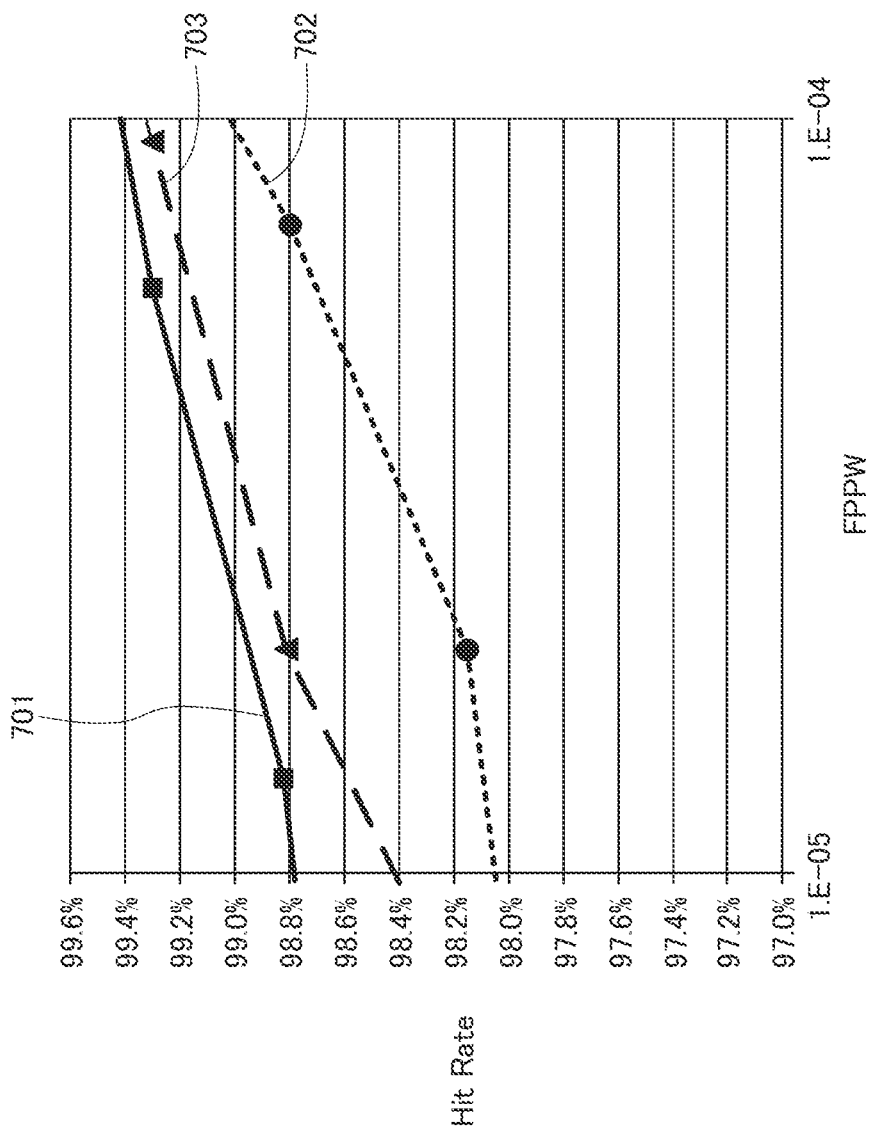
FIG. 13 is a graph illustrating the result of performance comparison evaluation of the object detecting system according to Embodiment 2.

FIG. 13 is a graph illustrating the result of performance comparison evaluation. In FIG. 13, the horizontal axis represents FPPW (False Positive Per Window), which is an erroneous detection rate for a data set that is not a detection target. The vertical axis represents Hit Rate, which is a detection rate for a data set that is a detection target.

In FIG. 13, line 701 (■) indicates a detection rate when local binary data is generated by employing the positions of comparison target pixels illustrated in FIG. 5 (that is, positions employed in the present embodiment). Line 702 (●) indicates a detection rate when local binary data is generated by employing the positions of comparison target pixels illustrated in FIG. 11. Line 703 (▲) indicates a detection rate when local binary data is generated by employing the positions of comparison target pixels illustrated in FIG. 12.

As illustrated in FIG. 13, it was evaluated that the performance of object detection was the highest when the positions enabling the extraction of intensity difference information in the largest number of directions were employed in sufficient consideration of the lens spatial frequency characteristics of the camera. Moreover, it was evaluated that the performance of object detection involving directions of comparison target pixels partially shifted between the neighborhood regions was higher than that involving the directions without being shifted at all.

The description has been given thus far of the difference in the performance of object detection between the case of sufficient consideration of the lens spatial frequency characteristics of the camera as described above and the case without consideration thereof.

As described above, object detecting system 100 including the feature extracting apparatus according to the present embodiment can generate an LBP using a comparison target pixel group placed so as to extract intensity difference information in as many directions as possible in consideration of the spatial frequency characteristics of the lens. Thereby, object detecting system 100 can extract a feature with high classification performance while reducing an increase in processing loads.

Object detecting system 100 generates a histogram for each feature extraction region, from LBPs that are such a feature with high classification performance, and detects an object from a target image. Thereby, object detecting system 100 can detect an object more accurately while reducing an increase in processing loads.

Alternatively, object detecting system 100 may detect an object using a classifier generated about LBPs without generating a histogram. Such a technique is suitable for the detection of objects, which can be classified from a significantly narrow range of an image, such as a local portion like an angle of mouth of a face, a characteristic pattern, and a symbol. That is, the technique is suitable for the detection of an object which can sufficiently be classified by one LBP.

Figure 14:
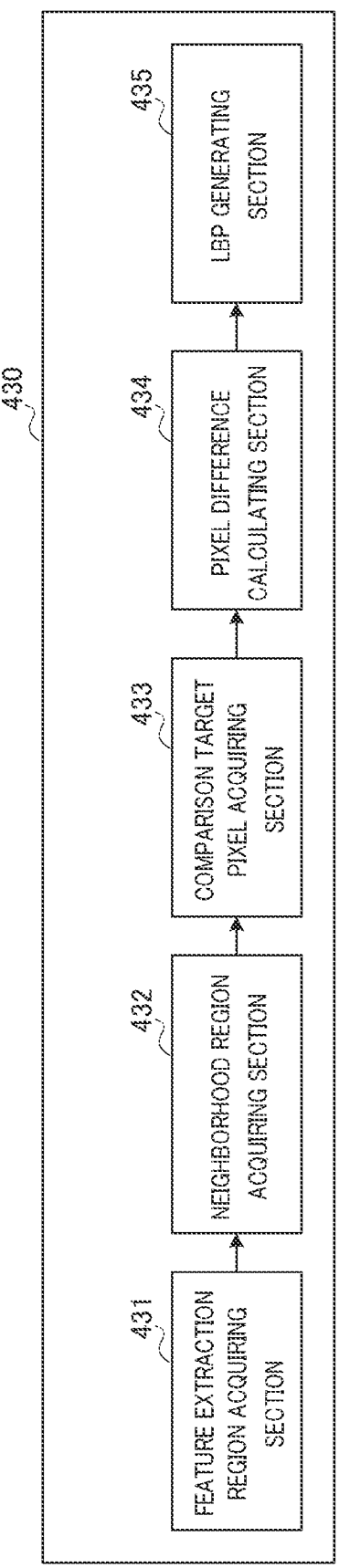
FIG. 14 is a block diagram illustrating an example of the configuration of a feature extracting section according to Embodiment 2.

In such a case, feature extracting section 430 does not need to include LBP histogram generating section 436 like a configuration as illustrated in FIG. 14.

Alternatively, in object detecting system 100, a lens used for imaging of a target image may be unspecified. In this case, for example, object detecting system 100 acquires the spatial frequency characteristic of a used lens every time, and determines the distances between multiple neighborhood regions and the distances between comparison target pixels (that is, placement of a comparison target pixel group) on the basis of the equal intensity distance. Alternatively, object detecting system 100 previously stores a classifier and a placement pattern of a comparison target pixel group for each of the spatial frequency characteristics of lenses, and chooses the corresponding classifier and placement pattern of a comparison target pixel group according to a change of a lens.

Although an LBP in the embodiment as hereinbefore described is binary data obtained by binarizing the difference values between a pixel of interest and comparison target pixels in each neighborhood region, any other data may be applied. Object detecting system 100 may use, for example, M-ary data according to the magnitudes of the difference values between a pixel of interest and comparison target pixels of each neighborhood region, or M-ary data obtained by assigning weighting to binary data, as an LBP.

Although classifier training apparatus 200, classifier storage section 300, and object detecting apparatus 400 are each configured as an individual apparatus in the embodiments, two or all of the apparatuses may also be integrated into a single apparatus. In particular, if classifier training apparatus 200 is integrated with object detecting apparatus 400, feature extracting sections 220 and 430 can be a shared functional section. Although Boosting is used as the machine learning method in the present embodiment, another machine learning method such as SVM (support vector machine) or decision trees may be used.

A feature extracting apparatus according this disclosure includes: a comparison target pixel acquiring section that acquires pixel values of a plurality of comparison target pixels included in a neighborhood region when an annular region having a pixel of interest at its center is set as the neighborhood region while all pixels or partial pixels in an image taken through a lens are each set as the pixel of interest; a pixel difference calculating section that calculates a difference between the pixel value of the pixel of interest and the pixel value of each of the comparison target pixels; and a local binary pattern generating section that generates a local binary pattern indicating, using a bit value, whether the difference between the pixel value and the pixel value of each of the comparison target pixels is equal to or greater than a predetermined threshold for each of the pixels, in which a plurality of the neighborhood regions are present for each of the pixels of interest, and a distance between the plurality of neighborhood regions is determined based on spatial frequency characteristics of the lens.

In the feature extracting apparatus according this disclosure, the plurality of comparison target pixels may be positioned in mutually different directions toward the pixel of interest.

In the feature extracting apparatus according this disclosure, the plurality of comparison target pixels may be discretely positioned at equal intervals in each of the neighborhood regions, and the plurality of comparison target pixels may be positioned in different directions toward the pixel of interest between the plurality of neighborhood regions.

In the feature extracting apparatus according this disclosure, the plurality of comparison target pixels may be positioned at angles toward the pixel of interest that are different from each other by a predetermined amount in an identical direction between the neighborhood regions that are adjacent to each other.

In the feature extracting apparatus according this disclosure, the distance between the plurality of neighborhood regions and a distance between the plurality of comparison target pixels for each of the neighborhood regions may be larger than a pixel distance that is considered to have identical intensity based on the spatial frequency characteristics of the lens.

In the feature extracting apparatus according this disclosure, the distance between the plurality of neighborhood regions may be equal to one, two, three, or four pixels.

The feature extracting apparatus according this disclosure may further include: a neighborhood region acquiring section that determines the neighborhood regions for each of the pixels of interest based on the spatial frequency characteristics of the lens; and a comparison target pixel acquiring section that determines the plurality of comparison target pixels for each of the pixels of interest based on the neighborhood regions determined by the neighborhood region acquiring section and the spatial frequency characteristics of the lens, and that acquires a pixel value of the pixel of interest and a pixel value of each of the determined plurality of comparison target pixels.

The feature extracting apparatus according this disclosure may further include: a classifier storage section that stores information on the local binary pattern indicating a feature of a detection target object; and a classifying section that determines whether the image includes the detection target object based on the local binary pattern generated from the image, using the information stored in the classifier storage section.

The feature extracting apparatus according this disclosure may further include a histogram generating section that generates a histogram indicating a distribution of the local binary patterns generated from the image, in which: the information stored in the classifier storage section may be a classifier generated based on the histogram of the image including the detection target object and the histogram of the image not including the detection target object; and the classifying section may apply the classifier to the histogram generated from the image and determines whether the image includes the detection target object.

A feature extracting method according to this disclosure includes: acquiring pixel values of a plurality of comparison target pixels included in a neighborhood region when an annular region having a pixel of interest at its center is set as the neighborhood region while all pixels or partial pixels in an image taken through a lens are each set as the pixel of interest; calculating a difference between the pixel value of the pixel of interest and the pixel value of each of the comparison target pixels; and generating a local binary pattern indicating, using a bit value, whether the difference between the pixel value and the pixel value of each of the comparison target pixels is equal to or greater than a predetermined threshold for each of the pixels, in which a plurality of the neighborhood regions are present for each of the pixels of interest, and a distance between the plurality of neighborhood regions is determined based on spatial frequency characteristics of the lens.

A feature extracting program stored on a non-transitory computer-readable medium according to this disclosure causes a computer to execute processing including: acquiring pixel values of a plurality of comparison target pixels included in a neighborhood region when an annular region having a pixel of interest at its center is set as the neighborhood region while all pixels or partial pixels in an image taken through a lens are each set as the pixel of interest; calculating a difference between the pixel value of the pixel of interest and the pixel value of each of the comparison target pixels; and generating a local binary pattern indicating, using a bit value, whether the difference between the pixel value and the pixel value of each of the comparison target pixels is equal to or greater than a predetermined threshold for each of the pixels, in which a plurality of the neighborhood regions are present for each of the pixels of interest, and a distance between the plurality of neighborhood regions is determined based on spatial frequency characteristics of the lens.

The disclosure of Japanese Patent Application No. 2012-004359, filed on Jan. 12, 2012, including the specification, drawings and abstract is incorporated herein by reference in its entirety.

INDUSTRIAL APPLICABILITY

The present invention is useful as a feature extracting apparatus, a feature extracting method, and a feature extracting program that can extract a feature with high classification performance while reducing an increase in processing loads.

REFERENCE SIGNS LIST

10 Feature extracting apparatus
100 Object detecting system
200 Classifier training apparatus
210 Training data storage section
220, 430 Feature extracting sections
240 Training section
300 Classifier storage section
400 Object detecting apparatus
410 Camera
420 Image receiving section
431 Feature extraction region acquiring section
432 Neighborhood region acquiring section
433 Comparison target pixel acquiring section
434 Pixel difference calculating section
435 LBP generating section
436 LBP histogram generating section
450 Classifying section

The invention claimed is:

1. A feature extracting apparatus comprising:
a receiver that receives a window region image which is a partial region of a target image taken through a lens; and
a control circuitry,
wherein the control circuitry is operative to:
set, for each of a plurality of pixels included in the window region image, a pixel as a pixel of interest and acquire pixel values of a plurality of comparison target pixels included in an annular neighborhood region having the pixel of interest at its center;
calculate a difference between the pixel value of the pixel of interest and the pixel value of each of the comparison target pixels; and
generate, for each of the plurality of pixels, a local binary pattern indicating, using bit values, whether the difference between the pixel value of the pixel and the pixel value of each of the comparison target pixels is equal to or greater than a predetermined threshold,
wherein
a plurality of the neighborhood regions are present for each of the pixels of interest, and a distance between the plurality of neighborhood regions is determined based on spatial frequency characteristics of the lens.

2. The feature extracting apparatus according to claim 1, wherein the plurality of comparison target pixels are positioned in mutually different directions toward the pixel of interest in each of the plurality of neighborhood regions corresponding to the pixel of interest.

3. The feature extracting apparatus according to claim 1, wherein the plurality of comparison target pixels are discretely positioned at equal intervals in each of the plurality of neighborhood regions corresponding to the pixel of interest, and the comparison target pixel included in a first neighborhood region of the plurality of neighborhood regions and the comparison target pixel included in a second neighborhood region of the plurality of neighborhood regions are positioned in different directions toward the pixel of interest.

4. The feature extracting apparatus according to claim 1, wherein the plurality of comparison target pixels are positioned at angles toward the pixel of interest that are different from each other by a predetermined amount between the neighborhood regions that are adjacent to each other.

5. The feature extracting apparatus according to claim 1, wherein the distance between the plurality of neighborhood regions is equal to one, two, three, or four pixels.

6. The feature extracting apparatus according to claim 1, wherein the control circuitry is further operative to:
determine the neighborhood regions for each of the pixels of interest based on the spatial frequency characteristics of the lens; and
determine the plurality of comparison target pixels for each of the pixels of interest based on the determined neighborhood regions and the spatial frequency characteristics of the lens, and acquire a pixel value of the pixel of interest and a pixel value of each of the determined plurality of comparison target pixels.

7. The feature extracting apparatus according to claim 1, further comprising a memory
that stores information on the local binary pattern indicating a feature of a detection target object,
wherein the control circuitry is further operative to;
determine whether the target image includes the detection target object based on the local binary pattern generated from the window region image, using the information stored in the memory.

8. The feature extracting apparatus according to claim 7, wherein the information stored in the memory is a classifier generated based on a histogram acquired from positive samples including the detection target object and a histogram acquired from negative samples not including the detection target object, and
wherein the control circuitry is further operative to:
generate the histograms, the histograms indicating a distribution of a plurality of the local binary patterns generated for each of the plurality of pixels; and
apply the classifier to a histogram generated from the window region image and determine whether the target image includes the detection target object.

9. A feature extracting method comprising:
receiving a window region image which is a partial region of a target image taken through a lens;
setting, for each of a plurality of pixels included in the window region image, the pixel as a pixel of interest and acquiring pixel values of a plurality of comparison target pixels included in an annular neighborhood region having the pixel of interest at its center;
calculating a difference between the pixel value of the pixel of interest and the pixel value of each of the comparison target pixels; and
generating, for each of the plurality of pixels, a local binary pattern indicating, using values, whether the difference between the pixel value of the pixel and the pixel value of each of the comparison target pixels is equal to or greater than a predetermined threshold, wherein a plurality of the neighborhood regions are present for each of the pixels of interest, and a distance between the plurality of neighborhood regions is determined based on spatial frequency characteristics of the lens.

10. A feature extracting program stored on a non-transitory computer-readable medium causing a computer to execute processing comprising:

receiving a window region image which is a partial region of a target image taken through a lens;

setting, for each of a plurality of pixels included in the window region image, the pixel as a pixel of interest and acquiring pixel values of a plurality of comparison target pixels included in an annular neighborhood region having the pixel of interest at its center;

calculating a difference between the pixel value of the pixel of interest and the pixel value of each of the comparison target pixels; and generating, for each of the plurality of pixels, a local binary pattern indicating, using a-bit values, whether the difference between the pixel value of the pixel and the pixel value of each of the comparison target pixels is equal to or greater than a predetermined threshold, wherein a plurality of the neighborhood regions are present for each of the pixels of interest, and a distance between the plurality of neighborhood regions is determined based on spatial frequency characteristics of the lens.

* * * * *